United States Patent [19]

Casmira

[11] Patent Number: 5,218,930
[45] Date of Patent: Jun. 15, 1993

[54] LITTER TRAY APPARATUS

[76] Inventor: Stephen Casmira, 488 Summer St., New Bedford, Mass. 02740

[21] Appl. No.: 985,566

[22] Filed: Dec. 3, 1992

Related U.S. Application Data

[63] Continuation-in-part of Ser. No. 903,196, Jun. 26, 1992, and a continuation-in-part of Ser. No. 898,733, Jun. 15, 1992, and a continuation-in-part of Ser. No. 933,948, Aug. 8, 1992.

[51] Int. Cl.[5] ............................................. A01K 67/00
[52] U.S. Cl. ..................................... 119/165; 119/161
[58] Field of Search ............... 119/161, 165, 166, 170, 119/19, 17

[56] References Cited

U.S. PATENT DOCUMENTS

| | | | |
|---|---|---|---|
| 3,246,630 | 4/1966 | Dearing et al. | 119/165 |
| 3,885,523 | 5/1975 | Coleman | 119/165 |
| 5,042,430 | 8/1991 | Casmira | 119/165 |
| 5,092,277 | 3/1992 | Baillie et al. | 119/165 |
| 5,165,366 | 11/1992 | Harvey | 119/165 |

Primary Examiner—Gene Mancene
Assistant Examiner—Thomas Price
Attorney, Agent, or Firm—Thomas A. Kahrl

[57] ABSTRACT

An improved litter tray apparatus in combination with a litter container and method of collecting litter material employing the litter tray apparatus; including one or more trays, each tray having a pan body having inclined walls, a bottom surface to define a pan space to receive litter material, characterized by an opening for receiving litter material scattered from the container including a hook and loop fastener for detachably mounting the tray on one side of the litter container; a grate positioned on the top surface for permitting litter material to pass downwardly through the opening into the pan body and for providing animal access for stepping in and out of the litter container comprising a grate member having mesh openings whereby, when the animal steps on the tray exiting the litter container, the litter material carried on the paws of the animal having just used the litter box are permitted to drop through the grate into the pan body of the tray for retention therein and subsequent removal by detaching the tray from the litter container.

4 Claims, 3 Drawing Sheets

LITTER TRAY APPARATUS

BACKGROUND OF THE INVENTION

This application is a continuation-in-part of U.S. patent application Ser. No.: 07/903,196 filed Jun. 26, 1992 and U.S. patent application Ser. No.: 07/898,733 filed Jun. 15, 1992 and U.S. patent application Ser. No.: 07/933,948 filed Aug. 8, 1992, which are incorporated herein by reference.

The present invention relates generally to litter trays used in combination with a litter box containing litter material for collecting litter scattered by pets. A pet such as a cat, typically scatters litter material out of the litter box during use thereof onto the adjacent floor or rug, thereby causing a mess. Also, particles of litter material often cling to the paws of the pet and then drop on the floor of the dwelling upon exiting the box, also adding to the mess.

Applicant's prior patent U.S. Pat. No. 5,042,430 issued Aug. 27, 1991, covering a litter collection apparatus was directed to provide a litter collection device that is hingedly attached to the top of walls of a litter container. While this device has been effective for collecting scattered litter material, it has at times been ineffective for those pets who are reluctant to step on the trays as attached to the upper portion of the sides of a litter box.

Accordingly, it is therefore desired to provide for a floor-mounted litter collection tray device to be used in combination with a litter container for collecting the litter particles scattered during use, which is simple, inexpensive, easily portable and overcomes problems of acceptance by pets of the prior art.

SUMMARY OF THE INVENTION

The present invention relates to a litter tray apparatus in combination with a litter container adapted to collect particles of litter scattered and dropped from the paws of a pet using the litter container.

In particular, the invention concerns a litter tray apparatus comprising one or more trays for connection to a litter box by an attachment device positioned on a floor, said box having four walls, and said trays connected to the floor adjacent the box. Each tray includes a grate and a hopper and a pan, for collecting litter material scattered by the pet using the litter box. Each tray also includes and a hook and loop attachment device for attaching the trays to the bottom portion of the container walls said trays being arranged selectively around the base perimeter of the box positioned on a floor surface.

The litter tray apparatus includes a plurality of embodiments of floor - mounted trays comprising a first preferred embodiment tray, a second embodiment floor mat tray and a third embodiment corner tray, each tray comprising a grate extending laterally, constructed of a screen mesh extending horizontally across the top opening provided in a pan portion of the tray having a flat bottom surface and generally curved sides and curved end walls which define a space within the pan to receive liter material for collection of waste and subsequent disposal.

In the preferred embodiment, shown in FIGS. 1-4, the present invention comprises an improved litter tray apparatus to be floor mounted and attached by fastening means to the base of one or more of the side walls of the litter container, containing litter material to be used by a pet for the elimination of wastes. The litter container includes a plurality of sidewalls with the litter tray apparatus being floor mounted and positioned adjacent one or more of the side walls adapted to collect the litter material by gravity action scattered by the pet during using material provided in the litter box. The tray includes a pan having base surface, a plurality of hook and loop fasteners including one or more side attachment hook and loop fasteners, and at least four grate hook and loop fasteners, and one or more container hook and loop fasteners positioned at the base of one or more walls of the litter container.

In the second embodiment floor mat tray as shown in FIGS. 5-10, the tray comprises a pair accurate portions for positioning adjacent the litter container for increased coverage for collecting scattered litter, and a pair of upwardly extending curved side walls, and an upwardly extending curved end wall at each end to guide litter material downwardly and inwardly into the pan. The floor mat grate is securely fastened to the top of the pan.

In the third embodiment corner tray, shown in FIGS. 11-17, the tray comprises a corner portion for positioning adjacent a corner of the litter container for improved corner coverage for collecting scattered litter, and a pair of upwardly extending curved side walls, and an upwardly extending curved end wall at each end to guide litter material downwardly and inwardly into the pan. The corner grate is securely fastened to the top of the pan. In particular, the invention concerns a litter collection apparatus comprising at least one floor mounted tray for attachment to a litter box having a grate and a collection pan covered by a mesh screen for collecting litter scattered by an animal using the litter container and providing a mat which is used as a step by the pet for entrance and exit from the litter box.

Inasmuch the litter container contains a plurality of walls, the litter container typically provides more and more access ways for entrance and exits by the pet, depending upon the positioning of the container, either against a wall or in an open space. The litter tray of the preferred embodiment, or alternatively, the floor mat embodiment or the corner embodiment may be selectively positioned adjacent a selected wall such that the selected tray is used by the pet as a stepping device for entrance and exit with the pet paws being placed on the mesh of the grate, which permits the particles to be dislodge from the pets paws, and to drop through the opening in the mesh into the open pan section.

In the preferred embodiment, the tray apparatus comprises a collection pan having an elongated opening of generally rectangular shape and a grate means positioned on top of the collection pan having a mesh construction providing a plurality of openings to permit litter material carried on the paws of an animal to drop through the grate into the collection pan, the grate means being attached along its outer edge to by a plurality of hook and loop fastener panels to the base of a selected wall of the litter container, having associated panels of hook and loop fastener material. A plurality of at least four hook and loop grate fastener panels are provided to releasably attach the grate to the top of the collection pan, adapted to be removed to permit removal of litter collected therein.

The litter tray apparatus of the invention may be of molded hard composite plastic material and the grate of a metallic wire mesh. The litter tray apparatus of the invention is a compact, simple, effective, relatively inexpensive apparatus for collecting litter scattered from a litter container through use by animals.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
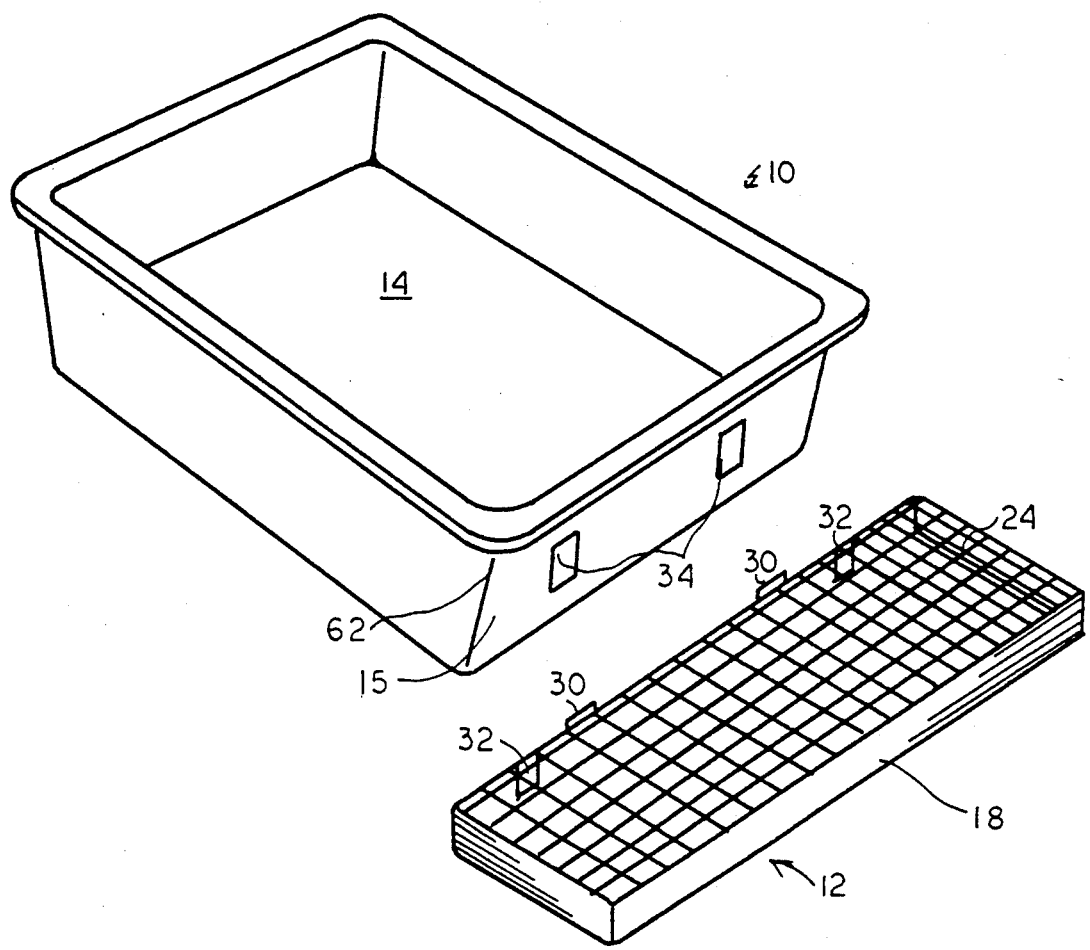
FIG. 1 is an perspective view of a litter tray apparatus embodying the first preferred embodiment of the present invention shown detached and adjacent a litter container shown without litter material having a pan and a grate.
Figure 2:
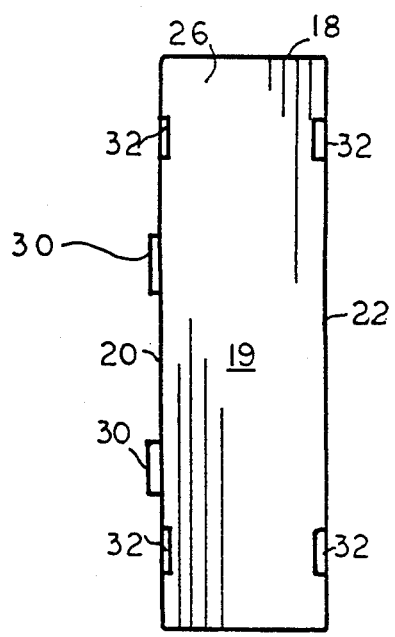
FIG. 2 is a top plan view of the pan of the litter tray apparatus of FIG. 1.
Figure 3:
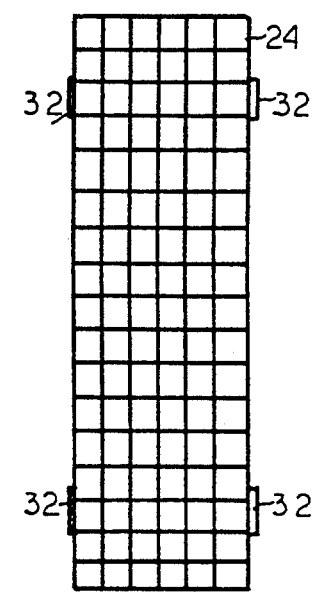
FIG. 3 is a top plan view of the grate of the litter tray apparatus of FIG. 1.
Figure 4:
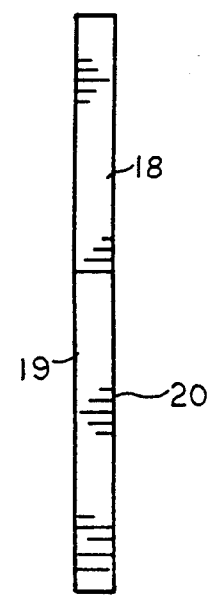
FIG. 4 is a side elevational view of the litter tray apparatus of FIG. 1.
Figure 5:
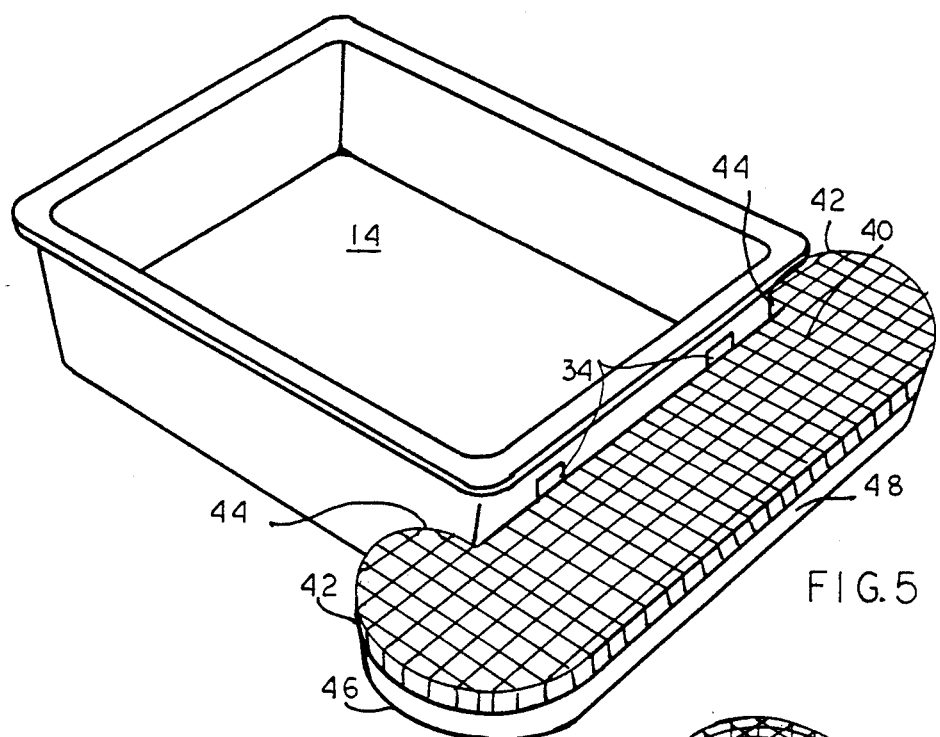
FIG. 5 is a perspective view from above of a floor mat litter tray apparatus of the invention showing the floor mat in the attached position at the base of a wall of the litter container.
Figure 6:
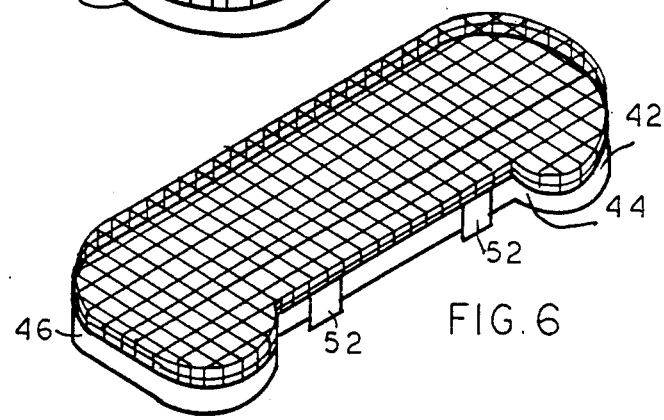
FIG. 6 is a perspective view of the floor mat litter tray apparatus of FIG. 5.
Figure 7:
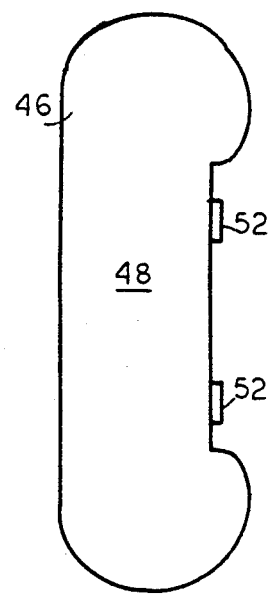
FIG. 7 is a bottom view of the floor mat litter tray apparatus of FIG. 5.
Figure 8:
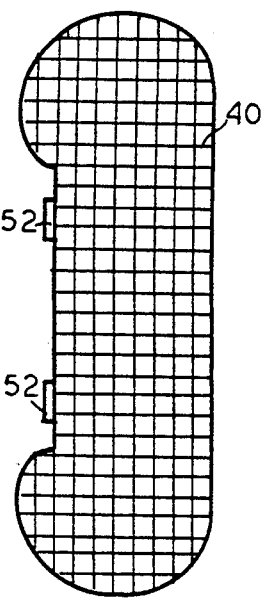
FIG. 8 is a top view of the floor mat litter apparatus of FIG. 5.
Figure 9:
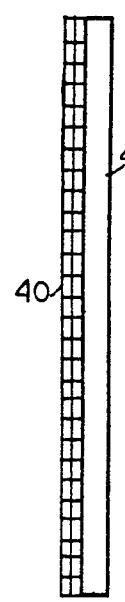
FIG. 9 is a end plan view of the floor mat litter apparatus of FIG. 5.
Figure 10:
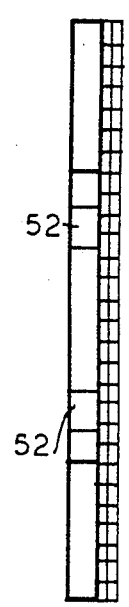
FIG. 10 is the opposite end view of the floor mat litter apparatus of FIG. 5
Figure 11:
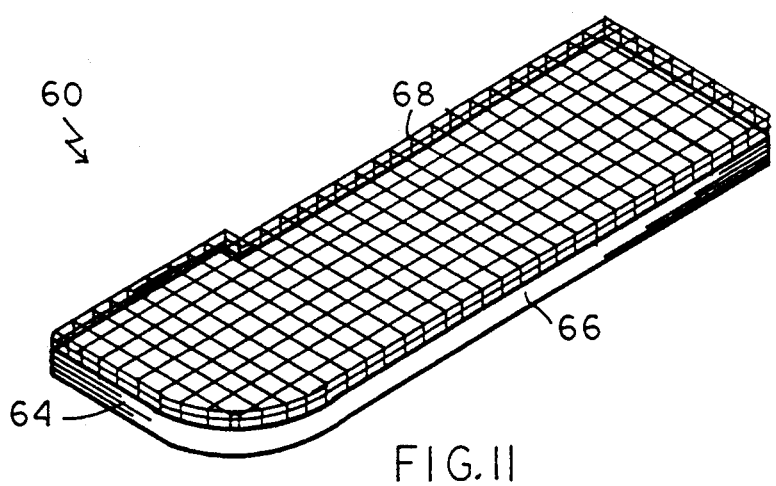
FIG. 11 is a perspective view from above of a litter corner tray apparatus of the invention.
Figure 12:
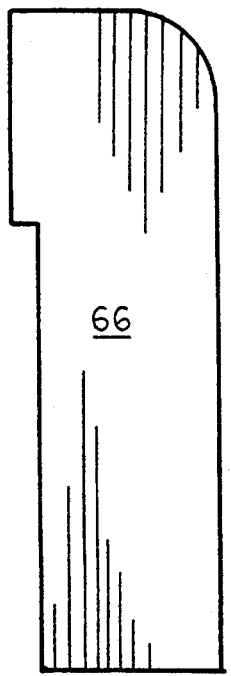
FIG. 12 is a bottom plan view of the litter corner apparatus of FIG. 11.
Figure 13:
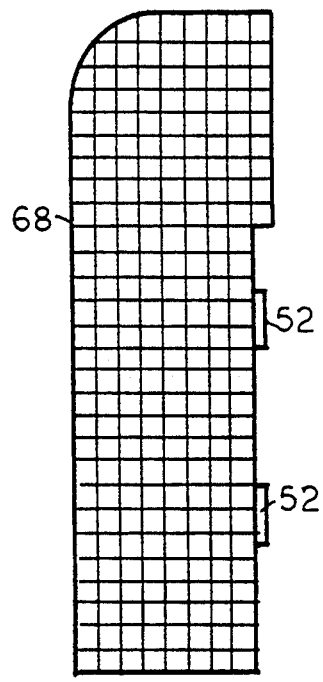
FIG. 13 is a top plan view of the litter corner apparatus of FIG. 11.
Figure 14:
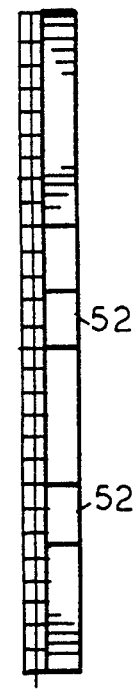
FIG. 14 is a side elevational view of the litter corner apparatus of FIG. 11.
Figure 15:
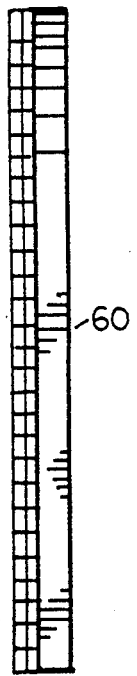
FIG. 15 is a end plan view of the litter corner apparatus of FIG. 11.
Figure 16:
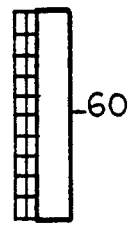
FIGS. 16 and 17 are opposite end views of the litter corner apparatus of FIG. 11.
Figure 17:
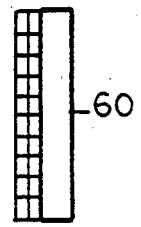

With reference to the drawings, FIGS. 1–4 show in combination a litter tray apparatus and a litter container 10 including a litter tray apparatus 12 and a litter container 14, illustrated as a Litter Box. The litter tray apparatus 12 is positioned adjacent the litter container 14 attached to wall 15 and comprises a pan 18 including a bottom 19 and a pair of sidewalls 20 and 22. As shown in FIGS. 1 and 4, the pan 18 is provided with a grate 24 of coarse mesh extending across the opening 26 a plurality of hook and loop fasteners including one or more side attachment hook and loop fasteners 30, at least four grate hook and loop fasteners 32, and at least one container hook and loop fasteners 34 secured to and positioned at the base of at least one wall of the litter container.

In a second embodiment a floor mat tray 40, as shown in FIGS. 5–10, is provided and comprises a pair arcuate portions 42 for positioning adjacent the litter container 10 and a pair of upwardly extending curved walls 44, and an end wall 46 at each end pan 48, with a floor mat grate 50 is securely fastened to the top of said pan. At least two hook and loop fasteners panels 52 are positioned on a side wall 54 positioned intermediate the curved walls 44, adapted to engage associated hook and loop fastener panels on the litter container 10 lower wall.

In the third embodiment corner tray, shown in FIGS. 11-17, a corner tray 60 is adapted for positioning adjacent a corner 62 of the litter container 14, shown in FIG. 1, for improved corner coverage for collecting scattered litter, and a pair of upwardly extending curved side walls, and a curved end wall 64 at one end and a corner pan 66. A corner grate 68 is securely fastened to the top of said pan.

What is claimed is:

1. A litter tray apparatus in combination with a litter container adapted to collect litter material comprising:
   a) a tray means for attachment to the litter container having
      i) a pan means for collecting litter material having an open top and a plurality of side walls to define a space to receive litter material;
   b) a grate means positioned on the open top of the pan means for permitting litter material to pass downwardly through the open top in the pan means and for providing animal access for stepping in and out of the litter container comprising a grate member having mesh openings;
   c) grate hook attachment means mounted on the tray means for releasably attaching the tray means to a top edge of the pan means about one of said sidewalls, comprising a plurality of panels of hook material;
   d) grate loop attachment means mounted on the grate means for releasably engaging the grate hook attachment means for attaching the tray means to the top edge of the pan means, comprising a plurality of panels of loop material;
   e) container hook attachment means mounted on the tray means for selectively and releasably attaching the tray means to a bottom edge of said one of said sidewalls of the litter container, further comprising a plurality of panels of hook material;
   f) container loop attachment means mounted on the litter container for selectively releasably engaging the container hook attachment means for attaching the tray means to the bottom edge of said one of said sidewalls of the litter container, comprising a plurality of panels of loop material; whereby, when the animal steps on the tray exiting the litter container, the litter material carried on the paws of the animal having just used the litter box are permitted to drop through the grate member in the pan means for retention therein and subsequent removal by detaching the tray means from the litter container.

2. The litter tray apparatus of claim 1 wherein the plurality of attachment means comprises a pair of panels of hook and loop fasteners, for abutting the adjoining walls of the litter container and tray means to position on an adjacent floor surface in a generally horizontal position parallel with the bottom of the litter container and to permit detachment of the tray means from the litter container.

3. The litter tray apparatus of claim 1 wherein the tray means includes, i) a pan body having arcuate end sections at opposite ends of said tray means,
ii) an open top, and
iii) a plurality of side walls to define a space to receive litter material.

4. The litter tray apparatus of claim 1 wherein the tray means includes,
   i) a pan body in the shape of an angle to be positioned about a corner of the container,
   ii) an open top, and
   iii) a plurality of side walls to define a space to receive litter material.

* * * * *